Dec. 30, 1969  E. HÜBNER  3,486,817
OVERHEAD PROJECTOR

Filed July 3, 1967  2 Sheets-Sheet 1

INVENTOR
ERWIN HÜBNER
BY
Krafft & Wells
ATTORNEYS

United States Patent Office 3,486,817
Patented Dec. 30, 1969

3,486,817
OVERHEAD PROJECTOR
Erwin Hubner, Wetzlar, Germany, assignor to Ernst Leitz, G.m.b.H., Wetzlar, Germany
Filed July 3, 1967, Ser. No. 650,723
Claims priority, application Germany, July 6, 1966, L 53,999
Int. Cl. G03b 21/28, 21/132
U.S. Cl. 353—98  6 Claims

ABSTRACT OF THE DISCLOSURE

An overhead projector with an illuminating apparatus positioned above the level of the transparency and to one side of the image forming optical system. The illuminating apparatus has an optical condenser that focuses an intermediate image of the lamp at a deflecting mirror which is positioned adjacent to the objective lens. The angle between the optic axis of the illuminating apparatus and of the objective is maintained as small as possible to insure that double images formed by the projection system are closely superimposed. The illuminating apparatus is in a fixed position in the projector and is independent of the displacement of the objective lens.

BACKGROUND OF THE INVENTION

The general field of the invention is optical projecting apparatus and the present apparatus is concerned with overhead projectors for projecting images on a nearby vertical screen or wall from a relatively large transparency resting on a horizontal stage. The state of the prior art is illustrated by application Ser. No. 399,651, filed Sept. 29, 1964, now U.S. Patent No. 3,293,982, of Roger H. Appeldorn, and German Patent No. 1,153,915, of Karl Mulch and Erwin Hübner, published Sept. 5, 1963, the disclosures of which are incorporated herein.

An overhead projector with an unsymmetrical reflective supporting stage is disclosed by Appeldorn for projecting images on a nearby vertical screen or wall from a relatively large transparency resting on a horizontal stage.

The present invention is a particular improvement over the projector disclosed in German Patent 1,153,915 which discloses a writing or image projector in which the illuminating device is positioned above the level of the writing or transparency at the side of the focusing apparatus.

For reflecting the light rays which penetrate the transparency or written surface, the prior are devices make use of a reflecting Fresnel lens which also serves as a support for the transparency. The optic axes of the illuminating device and of the objective are inclined at a given angle relative to a perpendicular to the surface of the transparency. In order to insure that the double images which are in any case formed by such a projection system are closely superimposed so as not to be discernible by the viewer, it is not only necessary for the reflecting surface to be positoned closely underneath the transparency, but it is also necessary to keep the angle between the optic axes of the illuminating device and of the objective as small as possible.

According to the disclosure of German Patent 1,153,-915, the angle between the optic axes of the illuminating device and the objective is maintained at a minimum by passing the illuminating rays through thet objective. The rays are bundled by using an optical lens. Such a contrivance has, however, the disadvantage that the illuminating rays are disturbed when focusing the objective. Besides changing the intensity of the illuminating of the transparency, there is also a lateral shifting of the radiation bundle, which makes an exact illumination of the transparency field impossible.

SUMMARY OF THE INVENTION

Having in mind that limitatians of the prior art, it is an object of the present invention to avoid these limitations and produce a substantially shadow-free projection of a transparency.

These objects are accomplished by:
 (a) Bringing the source of light to a focus in an intermediate plane;
 (b) Bringing the illuminating rays in the region of the intermediate focal plane into close proximity to, but outside of the objective; and
 (c) Maintaining all optical members which have an effect on the paths of the illuminating rays in fixed positions on the apparatus so that they are unaffected by any movement of the objective.

The results of projecting a transparency onto a vertical screen or wall are most favorable when the intermediate focal plane lies at the level of the ray entering side of the objective when the objective is in its closest position to the surface of the transparency. There are, however, certain limits as to the proximity of the optic axis of the illuminating rays to the objective mounting caused by the height of the objective and the range of its adjustment. The application of high quality objectives, which have inherently larger mounting which enlarge the range of distances from the screen, are however in contrast to (b) due to increased angular inclination of the optic axis to the perpendicular. In order to eliminate this difficulty, it is proposed to position the condenser lens axis parallel or inclined to the surface of the transparency and to position the required deflecting mirror in the intermediate focal plane. The image of the source of light is then immediately adjacent the objective.

A further improvement in this respect is made by the use of objective lenses and mountings of generally rectangular form to coincide with the shape of the surface of the transparency to be projected. The image of the light source is thereby brought closer to the objective axis and to the perpendicular.

A further embodiment of the inventive concept is to slightly roughen the surface of the deflecting mirror to diffuse the image of the source of light and thereby eliminate disturbing reflections. For this purpose the collecting element that is beneath the surface of the transparency is also made less reflecting in the middle region.

In order to obtain an illumination which is uniform over the entire area of the surface of the transparency, and in order to avoid unnecessary heating of the region around the object, another embodiment is contemplated. This embodiment comprises a diaphragm placed in the entrance pupil of the condenser, wherein the condenser consists of at least two lenses, so that an image of the diaphragm is formed on the surface of the transparency.

BRIEF DESCRIPTION OF THE DRAWINGS

Other objects and advantages of the present invention will become apparent from further study of the specification and claims, with particular reference to the drawings, wherein:

Figure 1:
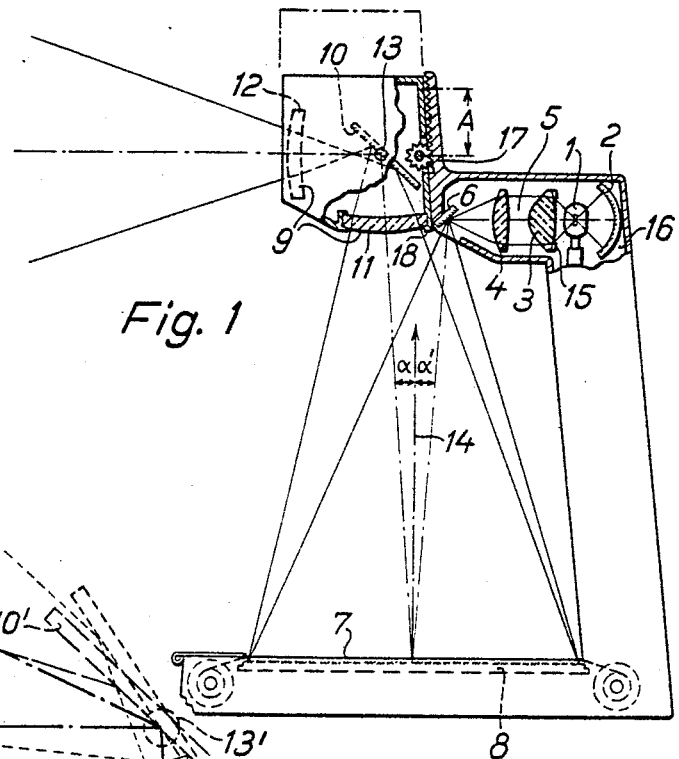
FIGURE 1 is a side view, partly in section, of the entire apparatus with the horizontally positioned condenser system and the deflecting mirror in the intermediate focal plane.

With particular reference to FIGURE 1, a housing 16 is shown having a base portion for the acceptance of a transparency and a vertical arm for containing the illuminating apparatus positioned above the level of the transparency. Within the housing 16 is contained the lamp 1, the concave mirror 2, condenser 5 consisting of two lenses 3 and 4, and fixed mirror 6. A diaphragm 15 is positioned between the light source 1 and the condenser 3, whose image is formed in the plane of the transparency and which is so formed that the illuminated field corresponds exactly to the transparency field. Vertical line 14 defines the perpendicular to the transparency 7. The objective 9 consists of lenses 11 and 12 with a deflecting mirror 10 between these lenses. The lens 11 is mounted in mounting ring 18. Lens 12 and the deflecting mirror 10 are tiltable about the axis 13. The complete objective head is adjustable in the direction of the arrow A by gearing 17.

Figure 2:
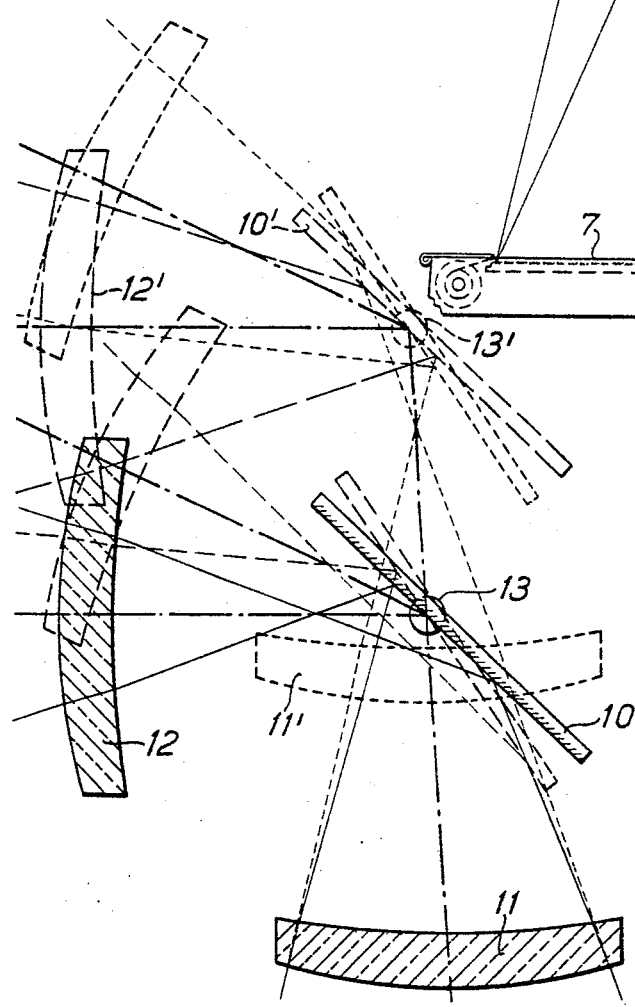
FIGURE 2 shows the projection objective of FIGURE 1 in different focusing positions.

In FIGURE 2, the parts 10, 11, 12 and 13 are shown in the position of the closest proximity of the objective head to the transparency 7. The parts 10′, 11′, 12′ and 13′ are shown in the position of minimum projection distance.

Figure 3:
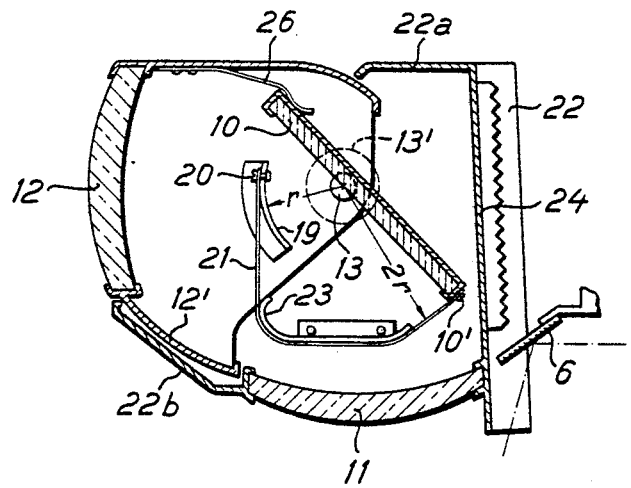
FIGURE 3 is a detailed view of the projection objective head of FIGURE 1.

As shown in FIGURE 3, the lens 12 is mounted in a frame 12′ which is tiltable about the axis 13. As a displacing element for this purpose, use is made of an adjusting knob 13′ shown by the dotted circle and projecting laterally from the vertically adjustable head-piece 22. The frame 12′ carries a segment 19 at a distance $r$ from the axis 13, with a ribbon 21 attached at 20 to the segment so that it can be wound upon the latter. The ribbon 21 is led over a guide 23 on the head-piece 22 and leaves the guide at a distance $2r$ from the axis 13, the outer end of the ribbon being attached to the frame 10′ of the mirror 10 at the same distance from the axis. This will cause the mirror to be tilted at half the angular rate of movement of the frame 12′.

The head-piece 22, which carries the housing members 22a, 22b and the lens 11, also has a rack 24 attached to it in mesh with a pinion 25 (FIGURE 1) rotatably mounted in the stationary housing 16 to effect vertical adjustment for focusing the objective. A spring 26 urges the frame of the mirror in one direction to keep the ribbon 21 under tension.

DESCRIPTION OF THE PREFERRED EMBODIMENTS

According to the apparatus as shown in the drawings, the light radiation from the lamp is reflected from the concave mirror 2 and directed into the condenser 5 consisting of two lenses 3 and 4. The condenser focuses the light on mirror 6 which diverts the radiation to a film record or transparency 7 into the Fresnel plate 8 immediately beneath the transparency. The Fresnel plate 8 serves also as a supporting surface for the transparency 7. The bundle of rays is reflected from the coated Fresnel plate and arrives at the objective 9 consisting of lenses 11 and 12 with a deflecting mirror 10 between these lenses. The complete objective head is adjustable in the direction of the arrow A by gearing 17 for focusing in the direction of the arrow in contrast to the illuminating device which is stationary in the housing 16.

Also for adjustment in height, a component consisting of the lens 12 and a deflecting mirror 10 is tiltable about the axis 13. The respective terminal positions of these parts are shown in FIGURE 2. According to FIGURE 2, the parts shown in solid lines are in the position of the closest proximity of the objective head of the transparency 7, namely, the greatest projection distance of lowest elevation angle. When the parts 10, 11 and 12 are in positions 10′, 11′ and 12′, they are in the position of minimum projection distance. For each of these two terminal positions, the lens 12 is also shown in broken lines in an upwardly tilted position and with the mirror 10 tilted upwardly through half of the same angle.

The mirror 6, which is in the intermediate focal plane of the lamp 1, is in the immediate proximity of the lens 11 and its mounting ring 18. The angles α and α′ between the axes of incident bundles of illuminating rays and the reflected bundles of image carrying rays remain relatively small with reference to the perpendicular 14 to the transparency. These angles are also independent of the kind and size of the source of light and of the condenser. A displacement of the objective has no effect on the illuminating rays and insures that for all projection distances the illumination conditions are the same.

For limiting the dimensions of the object and for adaptation to its form, there is positioned between the light source 1 and the condenser 3, a diaphragm 15 whose image is formed in the plane of the transparency.

In a particular embodiment, the surface of the mirror 6 is slightly roughened to diffuse the image of the source of light and thereby eliminate disturbing reflections.

It will be understood that this invention is susceptible to modificaton in order to adapt it to different usages and conditions and, accordingly, it is desired to comprehend such modifications within this invention as may fall within the scope of the appended claims.

I claim:

1. In an overhead projector having a base, means for mounting a transparency in the base, a vertical arm connected to said base and containing means for illuminating comprising a light source and optical members, a displaceable objective having a mounting ring at the inlet side, said objective positioned on said vertical arm above the means for mounting, the improvement comprising maintaining an angle between the optic axes of the means for illuminating and of the objective as small as possible to insure that double images formed by the projection system are closely superimposed, by the following elements in combination:
   (a) said optical members including optical condenser means for focusing an intermediate image of the lamp at a given point in the immediate proximity to the mounting ring at the same level as said mounting ring of the objective when the latter is in its closest working proximity to said means for mounting; and
   (b) said illuminating means being independent of any displacement of said objective.

2. The projector of claim 1, wherein said means for mounting contains a transparency with a rectangular shape and said objective has objective lenses and mountings with rectangular shapes corresponding to the rectangular shape of said transparency.

3. The projector of claim 2, wherein said optical members define a condenser axis and said axis is parallel to the axis of the transparency.

4. The projector of claim 3 further comprising a deflecting mirror on said vertical arm at said given point for projecting said intermediate image.

5. The projector of claim 4, wherein the deflecting mirror is roughened.

6. The projector of claim 3, wherein the condenser consists of at least two lenses having an image of the condenser entrance pupil and said image is formed upon the transparency.

References Cited

UNITED STATES PATENTS

| 1,202,754 | 10/1916 | Patterson. |
| 2,238,008 | 4/1941 | Beck et al. |
| 3,087,382 | 4/1963 | De Nygorden. |
| 3,249,002 | 5/1966 | Roop. |
| 3,340,765 | 9/1967 | Herriott. |

NORTON ANSHER, Primary Examiner

R. P. GREINER, Assistant Examiner

U.S. Cl. X.R.

353—38, 64, 66, 99